April 14, 1970      A. MARZOCCHI      3,506,476
GLASS FIBER-ELASTOMERIC PRODUCTS AND METHOD
Filed Aug. 15, 1966
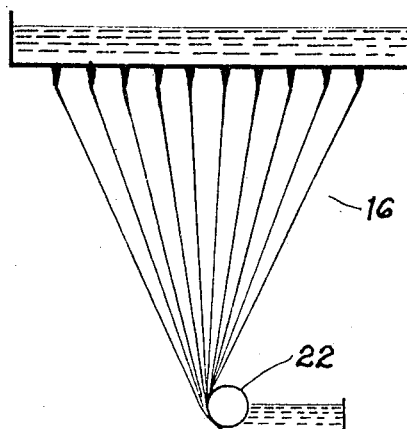
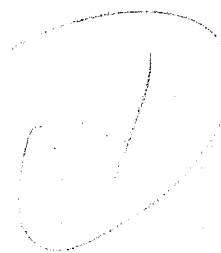
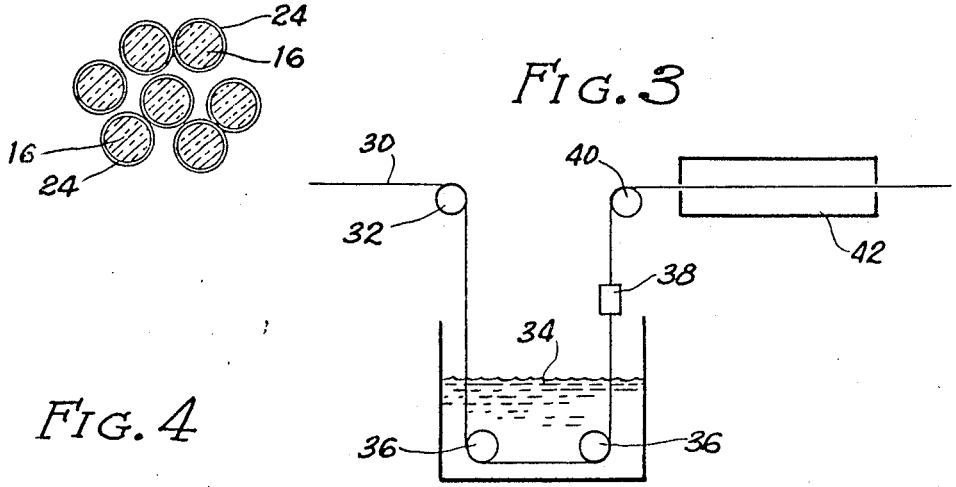
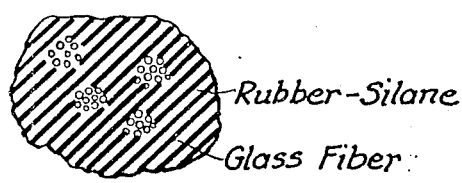
INVENTOR
Alfred Marzocchi
by Staelin & Overman
Attys United States Patent Office 3,506,476
Patented Apr. 14, 1970

3,506,476
GLASS FIBER-ELASTOMERIC PRODUCTS
AND METHOD
Alfred Marzocchi, Cumberland, R.I., assignor to Owens-Corning Fiberglas Corporation, a corporation of Delaware
Filed Aug. 15, 1966, Ser. No. 572,307
Int. Cl. C03c 25/00; B44d 1/14
U.S. Cl. 117—72
4 Claims

ABSTRACT OF THE DISCLOSURE

Glass fiber reinforced elastomeric products in which the bonding relationship between the glass fibers and the elastomeric material is achieved by pretreatment of the glass fibers to coat the fibers or to impregnate bundles of glass fibers with a resorcinol formaldehyde/rubber system and in which the continuous phase elastomer is in the form of a silanized elastomer, preferably formed with an amino or glycidyl silane.

---

This invention relates to the production of glass fiber-elastomeric products wherein a strong and permanent bonded relationship is established between the glass fiber component and the elastomeric material for achieving fuller utilization of the high strength and other properties intended to be contributed by the glass fiber component to the final product.

As is now well known, glass fibers are an exceptional material by reason of their extremely high strength, resistance to attack by chemicals, fungus and the like, high thermal stability, non-flammability, good electrical and thermal insulating characteristics, and low heat conductivity, just to mention a few of the properties which make glass fibers a desirable component in combination with the elastomeric materials in the fabrication of elastomeric-glass fiber products. The difficulties which have been encountered reside in the inability to achieve a strong and permanent bond which will tie the glass fibers in with the elastomeric material so as to become an integral component of the final product.

Extensive research has been conducted to overcome this problem with respect to the combination of glass fibers with resinous materials in the manufacture of glass fiber reinforced plastics and laminates. For most of the synthetic resinous materials, substantial inroads have been made towards successful combination of glass fibers and resinous materials. Major attention is now being addressed towards achieving a similar technological advance by the combination of glass fibers with elastomeric materials to improve the strength, wear and other physical and mechanical properties of the elastomeric product.

Unfortunately the elastomeric materials are sufficiently unlike the resinous materials, from the standpoint of chemistry and cure, whereby the techniques which have been found successful in the combination of glass fibers and resinous materials do not find equal success with glass fibers and elastomeric materials in the manufacture of glass fiber-elastomeric products. Thus an independent approach based upon the different chemistry, cure and conditions has been indicated for this particular system.

It is an object of this invention to produce and to provide a method for producing glass fiber-elastomeric products wherein a good and permanent bond is achieved between the glass fiber component and the elastomeric materials; wherein the glass fiber component becomes an integral part of the elastomeric system for maximizing the properties of the glass fibers in the glass fiber-elastomeric product; and wherein the combination yields a homogeneous product having improved mechanical and physical properties.

This and other objects and advantages of this invention will hereinafter appear and for purposes of illustration, but not of limitation, embodiments of the invention are shown in the accompanying drawing, in which:

FIG. 1 is a schematic diagram of the continuous fiber forming and sizing process;

FIG. 2 is a sectional view of a treated glass fiber bundle;

FIG. 3 is a schematic diagram for impregnation of a bundle of sized glass fibers; and FIG. 4 is a sectional view through a portion of a glass fiber-elastomeric product prepared in accordance with the practice of this invention.

In the copending application Ser. No. 400,517, filed Sept. 30, 1964 now abandoned, and titled "Glass Fiber Reinforced Elastomers," description is made of the treatment of glass fibers, prior to their combination with an elastomeric material, by coating the glass fibers or by impregnating the bundle of glass fibers with the composition to coat tht glass fibers with the combination of a resorcinol-aldehyde resin-rubber latex, hereinafter referred to as the RFL treatment which will be described in greater detail in the examples.

It has now been found that the adhesion between the glass fiber component and the elastomeric material with which the glass fibers are combined in the manufacture of glass fiber-elastomeric products, is increased by an unexpected amount when the elastomeric component, combined with the glass fibers treated in the manner described in the aforementioned copending application, is formulated to contain an amino silane, its hydrolysis product or its polymerization product.

The reason for the increased bond strength that is achieved by the combination of the continuous phase elastomer containing the amino organo silicon compound and the glass fibers previously coated or impregnated with the RFL system is not known. Nonetheless, the presence of the amino silane or its hydrolysis product or its polymerization product in the continuous phase elastomer produces a glass fiber-elastomeric product having markedly increased strength by comparison with the combination which makes use of the same elastomer without the organo silicon amine compound.

As the elastomer component, best results are secured with butyl rubber or with ethylene-propylene terpolymer, but increased adhesion of unexpectedly high proportions is also experienced in the combination of the organo silicon amine compound with other elastomeric materials forming the continuous phase in the glass fiber-elastomeric product such as natural rubber, gutta percha, balata, butadiene-styrene copolymer, isoprene, chloroprene, neoprene and the like.

The term "glass fibers" as used herein shall refer to continuous glass fibers formed by the rapid attenuation of hundreds of streams of molten glass and to strands formed when such continuous glass fiber filaments are gathered together in forming, and to yarns and cords formed by plying and/or twisting a number of strands together, and to woven and non-woven fabrics which are formed of such glass fiber strands, yarns or cords, and discontinuous fibers formed by high pressure steam or air directed angularly downwardly onto multiple streams of molten glass issuing from the bottom side of a glass melting bushing and to yarns that are formed when such discontinuous fibers are gathered together and drafted into a silver and to woven and non-woven fabrics formed of such yarns or of discontinuous fibers, and combinations of such continuous and discontinuous fibers in strand, yarns and fabrics formed thereof, and the term is also intended to include thin flexible platelets of glass in the form of flakes and the like, hereinafter referred to collectively as glass fiber bundles.

As the amino silane, its hydrolysis product and its polymerization product, best use is made of gamma-aminopropyltriethoxy silane, its hydrolysis product or its polymerization product. Instead of gamma-aminopropyltriethoxy silane, use can be made of other silanes, their hydrolysis products or polymerization products in which the organic group attached to the silicon atom contains an amino group, such as gamma-aminovinyldiethoxy silane, gamma(triethoxysilylpropylamide)polyamine, N gamma-triethoxysilylpropyl) propylamine, beta-aminoallyltriethoxy silane, and para-aminophenyltriethoxy silane.

The amount of amino silicon compound in the elastomer should be more than 0.3% by weight of the elastomer but not more than 10% by weight. In practice, it is preferred to make use of an amount within the range of 1–3% of the elastomer.

Whilt not equivalent to the organo silicon amino compounds, improved adhesion is also achieved when the organo silicon compound combined with the elastomeric material before combination with the glass fiber component and before cure or vulcanization comprises, a silane, its hydrolysis product or its polymerization product wherein the organic group attached to the silicon atom contains a labile hydrogen atom. Representative of the latter group of compounds are such silanes as

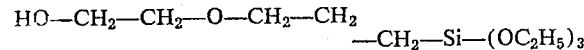

or other glycol silane derivatives; gamma-mercaptopropyltriethoxy silane or other mercapto silanes; and carboxy silanes. Silanes having an active hydrogen attached directly onto the silicon atom, such as dimethyl silane, are also capable of participation in the reaction.

Glycidal ether silanes, silanols or polysiloxanes can also be used especially in the combination with the polysulfide rubbers of the Thiokol Corporation.

Illustration will now be made of the practice of this invention with glass fibers which have been pretreated by impregnation or by sizing to coat the glass fibers with an RFL composition prior to the combination with the uncured elastomeric material.

PRETREATMENT OF THE GLASS FIBERS

By sizing with an RFL composition:

Example 1

| | Parts by weight |
|---|---|
| Resorcinol-formaldehyde resin | 2–10 |
| Formaldehyde (37% solution) | 1–3 |
| Tetramethyl ammonium hydroxide | 2–5 |
| Vinyl pyridine terpolymer latex (42% solids) | 15–50 |
| Neoprene rubber latex (50% solids) | 25–50 |
| Butadiene latex (60 % solids) | 5–15 |
| Alkali metal hydroxide | 0.1–0.2 |
| Gamma-aminopropyltriethoxy silane | 0.1–3.0 |

Example 2

| | Parts by weight |
|---|---|
| Resorcinol-formaldehyde resin | 2.0 |
| Formaldehyde (37% solution) | 1.0 |
| Concentrated ammonium hydroxide | 2.0 |
| Vinyl pyridine terpolymer latex (42% solids) | 25.0 |
| Neoprene rubber latex (50% solids) | 41.0 |
| Butadiene latex (60% solids) | 5.0 |
| Sodium hydroxide | .05 |
| Gamma-aminopropyltriethoxy silane | 1.0 |
| Water | 1100 |

The size composition of Example 1 is diluted with water to form an aqueous dispersion in an amount to provide for a solids content within the range of 5–40% by weight. The size compositions of Examples 1 and 2 are applied to the glass fibers in forming to deposit a coating on the glass fiber surfaces corresponding to 20–45% by weight of the sized glass fibers.

When the glass fibers are sized in forming with a size composition of the type illustrated in Examples 1 and 2, the sized fibers can be processed directly into strands, yarns, cords or fabrics, or they may be used alone in combination with the elastomeric materials without the need for impregnation of the bundles of glass fibers since the individual fibers in the bundles are provided with the RFL coating for the combination with the elastomeric material with which the sized glass fibers are combined in accordance with the practice of this invention.

By impregnation with a RFL composition:

In the impregnation of glass fiber bundles, the fibers are first sized in forming with a conventional glass fiber size composition, preferably also containing an anchoring agent, to enable the processing of the glass fibers into strands, yarns, bundles or fabrics, in which form the glass fiber bundles are impregnated with the glass fiber composition.

Forming size composition:

Example 3

| | Parts by weight |
|---|---|
| Partially dextrinized starch | 8.0 |
| Hydrogenated vegetable oil | 1.8 |
| Lauryl amine acetate cationic wetting agent | 0.4 |
| Nonionic emulsifying agent | 0.2 |
| Gamma-aminopropytriethoxy silane | 1.0 |
| Water | 88.6 |

Forming size composition:

Example 4

| | Parts by weight |
|---|---|
| Saturated polyester resin | 3.2 |
| Fatty acid amine wetting agent (Nopcogen 16L) | 0.1 |
| Polyvinyl alcohol | 0.1 |
| Polyvinyl pyrrolidone | 3.0 |
| Gamma-aminopropyltriethoxy silane | 0.3 |
| Glacial acetic acid | 0.1 |
| Water | 93.2 |

Forming size composition:

Example 5

| | Parts by weight |
|---|---|
| Paraffin wax | 0.2 |
| Cationic amide polyester resin | 1.3 |
| Polyglycol condensate (300–400 MW) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 91.5 |

As illustrated in the schematic diagram of FIG. 1 which is illustrative of the application of the forming size to continuous glass fibers, the glass in melted in a glass melting furnace 10 having a bushing 12 on the bottom side. The bushing is formed with a plurality of openings extending therethrough and the molten glass flows gravitationally through the hundreds of small openings in the bushing to form streams 14 which are rapidly attenuated into fine glass filaments 16 by winding the filaments about a rapidly rotating drum 20. The filaments are sized with one of the size compositions of Examples 1–5 as they are gathered together to form a strand. For this purpose, use is made of an applicator 22, which is illustrated, or a wiping pad that is constantly wet with the forming size composition. The filaments of glass are each wet with the size composition as they are gathered together into the strand 18 that is wound about the drum 20. The sized strands are allowed to air dry or drying can be accelerated by exposure to elevated temperature, such as a temperature within the range of 150–300° F.

The applied size forms a very thin coating 24 on the surfaces of glass fibers 16 to impart a desired balance of lubricity and bonding without destroying the fibrous characteristics or appearance of the fibers. The strand 18 of sized glass fibers are preferably plied with other strands and twisted to form yarns, threads or cords which may be used as a reinforcement for the elastomeric material, with or without cutting to shorter lengths, and which can be formed into woven or nonwoven fabrics for subsequent combination with the elastomeric materials.

After the fibers sized in accordance with Examples 3–5 have been processed into strands, cords, yarns or fabrics, they are impregnated with an RFL composition, as in the following examples:

Impregnating composition:

Example 6

| | Parts by weight |
|---|---|
| Resorcinol-formaldehyde resin | 2–10 |
| Formaldehyde (37% solution) | 1–3 |
| Quaternary ammonium hydroxide (tetramethyl ammonium hydroxide) | 2–5 |
| Vinyl pyridine terpolymer latex (42% solids) | 15–50 |
| Neoprene rubber latex (50% solids) | 25–50 |
| Butadiene latex (60% solids) | 5–15 |
| Alkali metal hydroxide | 0.5–0.2 |

In the foregoing example water is incorporated with the foregoing materials in amounts to produce an impregnating composition having a solids content of 10–50% by weight.

Impregnating composition:

Example 7

| | Parts by weight |
|---|---|
| Resorcinol-formaldehyde resin (Penacolite resin) | 2.0 |
| Formaldehyde (37% solution) | 1.4 |
| Concentrated ammonium hydroxide | 5.0 |
| Vinyl pyridine terpolymer (50% solids) | 25.0 |
| Neoprene rubber latex (50% solids) | 50.0 |
| Butadiene latex (60% solids) (Pyolite 2104) | 7.4 |
| Sodium hydroxide | 0.2 |
| Water | 58.0 |

Introduction of the impregnating composition should be made in amount to provide a dry solids of 5–25% by weight of the glass fiber system and preferably 10–15% by weight.

Impregnation with the aqueous compositions of Examples 6 and 7 can be made by way of a solvent bushing but it can also be achieved by other conventional means for impregnation, such as by immersion of the bundle of glass fibers in a bath of aqueous impregnating composition. Referring more specifically to FIG. 3 of the drawing, the glass fiber bundle 30 of Examples 3–5 is advanced over a guide roller 32 for passage downwardly into the bath 34 containing the impregnating composition of Example 6 or 7. The bundle is then turned under roller 36 to effect a sharp bend which operates to open the bundle to enable fuller penetration of the aqueous impregnating composition into the bundle of sized fibers. The impregnated bundle is then raised from the bath and passed through a roller die 38 which operates to remove excess impregnating composition from the bundle and to work impregnating composition into the bundle. Thereafter the endless bundle is advanced over roller 40 into a drying oven, preferably in the form of an air drying oven 42, maintained at a temperature above ambient temperature and preferably at a temperature within the range of 150–350° F. to accelerate removal of diluent and to set the impregnating material in situ in the glass fiber bundle. Drying will occur in a relatively short period of time of from 1–30 minutes depending upon the drying temperature.

In the foregoing examples, the resorcinol-formaldehyde resin is represented by a resinous material marketed in the United States under the trade name "Penacolite Resin" which comprises the condensation reaction of resorcinol and formaldehyde in a molecular ratio of about 2 to 1. Such systems as embody the resorcinol-formaldehyde resin and the organo silicon compound, as represented by Examples 1, 2, 6 and 7, should be maintained at a pH above 10 for solution of the silane. This is accomplished by the ammonium hydroxide, tetramethyl ammonium hydroxide or alkali metal hydroxide.

In the foregoing examples, the component referred to as vinyl pyridine terpolymer is more properly identified as a butadienestyrene-vinyl pyridine terpolymer of the type manufactured by the U.S. Rubber Company under the trade name "Gentac," or by the Goodyear Tire & Rubber Company under the trade name "Pliolite VP–100."

The elastomeric system adapted to form the continuous phase, in which the resorcinol-formaldehyde-latex treated glass fiber component is to be incorporated, is formulated with 0.3–10% by weight of an organo silicon amine intimately mixed with the continuous phase elastomer before combination with the treated glass fibers and before advance of the elastomer to the cured or vulcanized stage. Formulation of the elastomeric component may be illustrated by the following examples:

EXAMPLE 8

| | Parts by weight |
|---|---|
| Butyl rubber (Butyl 365) | 100 |
| Powdered zinc oxide | 5 |
| Furnace black (FEF Black) | 50 |
| Tetramethylthiuram disulfide (Methyl Tuads) | 1.5 |
| Gamma-aminopropyltriethoxy silane | 1.5 |
| Stearic acid | 2 |
| 2-mercaptobenzothiazole (Captax) | 1 |
| Sulphur | 1.25 |

EXAMPLE 9

| | |
|---|---|
| Ethylene-propylene terpolymer rubber | 100 |
| Carbon black (FEF Black) | 75 |
| Zinc oxide | 5 |
| Captax (2-mercaptobenzothiazole) | 0.5 |
| Stearic acid | 1 |
| Circosol 2XH | 30 |
| Para-aminophenyltriethoxy silane | 2 |
| Sulphur | 1.5 |
| Monex (tetramethylthiuram monosulfide) | 1.5 |

EXAMPLE 10

| | |
|---|---|
| Chlorobutyl rubber (HT 1066) | 100 |
| Zinc oxide | 3 |
| Furnace black (HAF) | 50 |
| Maglite D | 2 |
| Stearic acid | 1 |
| Benzothiazyl disulfide (Altax) | 2 |
| Tetramethylthiuram disulfide (Monex) | 1 |
| Gamma-aminopropyltriethoxy silane | 1 |
| Antioxidant (2246) | 1 |

In the foregoing compositions, the elastomer is in an uncured or unvulcanized state with sufficient vulcanizing agent present or curing agent to advance the elastomer to the cured or vulcanized state when molded under pressure at a temperature within the range of 280–370° F. and preferably at a temperature of about 320° F. for advancing the elastomeric material to cure. The gamma-aminopropyltriethoxy silane or the para-aminophenyltriethoxy silane in the foregoing examples may be replaced in whole or in part with others of the amino silanes, their hydrolysis products or polymerization products as heretofore described. It is believed that the amino silane crossreacts during cure or vulcanization with groupings available in the uncured or unvulcanized elastomeric material to tie in the organo silicon component to form a part of the rubber molecule and that the formed silyl elastomer compound becomes capable of strong and permanent integration with the RFL component on the glass fiber surfaces, which preferably also contains an anchoring agent whereby the glass fiber bundles become an integral part of the elastomeric product to maximize its contributions from the standpoint of physical and mechanical properties.

The glass fiber bundles and the uncured or unvulcanized elastomeric material are combined in the conventional manner for the preparation of fiber reinforced elastomeric products and the elastomeric material is advanced to the cured or vulcanized stage in the normal procedures and conditions well known to the industry.

I claim:

1. A glass fiber reinforced elastomeric product wherein the glass fibers, prior to their combination with the elastomeric component, have a coating consisting essentially of resorcinol-aldebyde/rubber on the surfaces thereof and in which said elastomeric component contains 0.3 to 10 percent by weight of an organo silicon compound cross reacted therewith in which the organo silicon compound is formed of an amino silane, a silane having a labile hydrogen atom or a glycidyl ether silane.

2. The product as claimed in claim 1 in which the silane is gamma-aminopropyltriethoxy silane.

3. The product as claimed in claim 1 in which the silane is a glycol silane derivative.

4. The product as claimed in claim 1 in which the organo silicon compound is present in the elastomeric component in an amount within the range of 1 to 3 percent by weight.

References Cited

UNITED STATES PATENTS

| | | | |
|---|---|---|---|
| 3,284,179 | 11/1966 | Eilerman | 117—126 X |
| 3,350,345 | 10/1967 | Vanderbilt et al. | 117—126 X |
| 3,367,793 | 2/1968 | Atwell | 117—126 |

WILLIAM D. MARTIN, Primary Examiner

D. COHEN, Assistant Examiner

U.S. Cl. X.R.

117—76, 126